April 14, 1931. J. MEINKEN 1,800,463
RELIEF VALVE
Filed Nov. 21, 1929 2 Sheets-Sheet 1
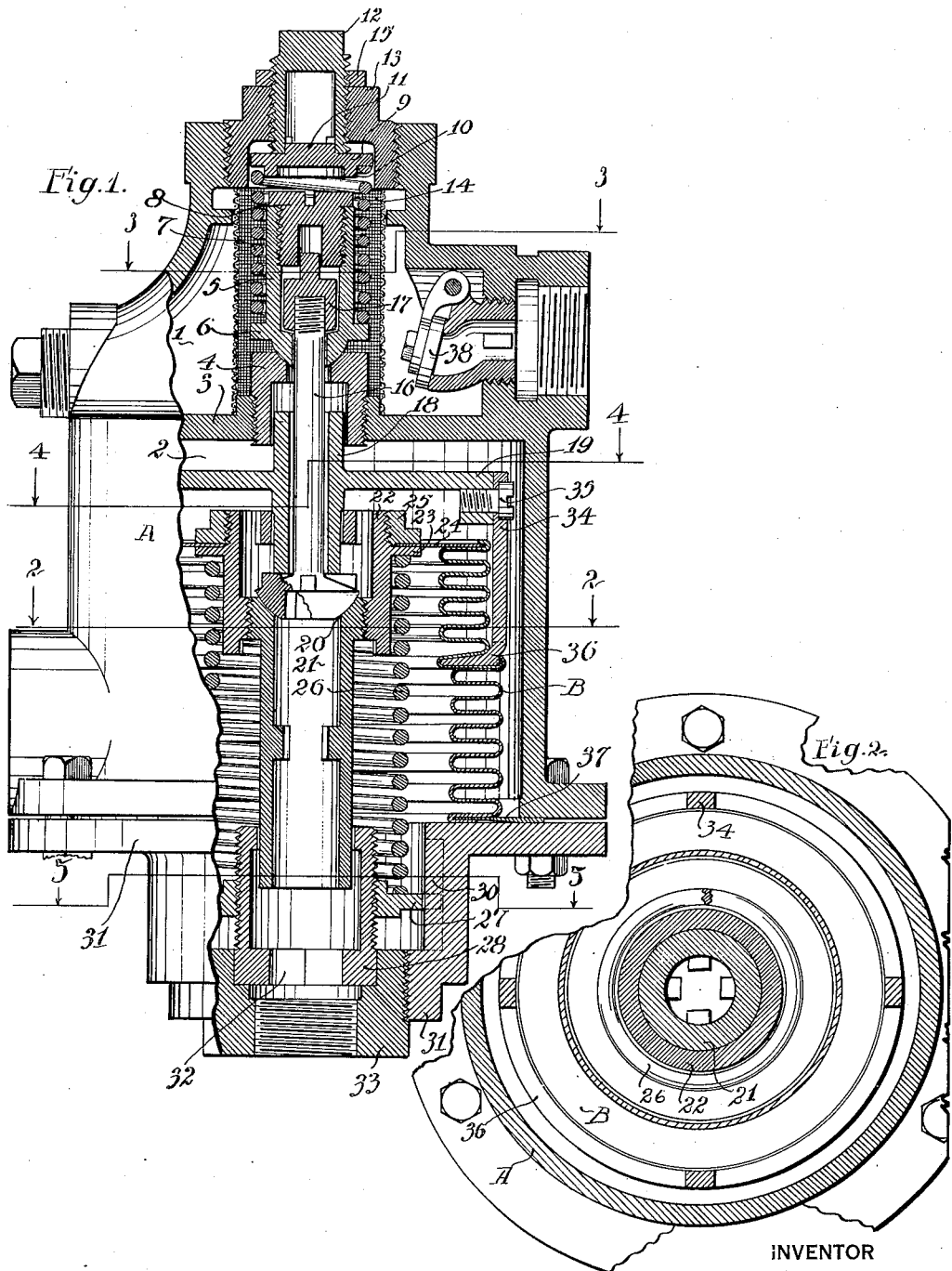
INVENTOR
John Meinken
ATTORNEY April 14, 1931. J. MEINKEN 1,800,463
RELIEF VALVE
Filed Nov. 21, 1929 2 Sheets-Sheet 2
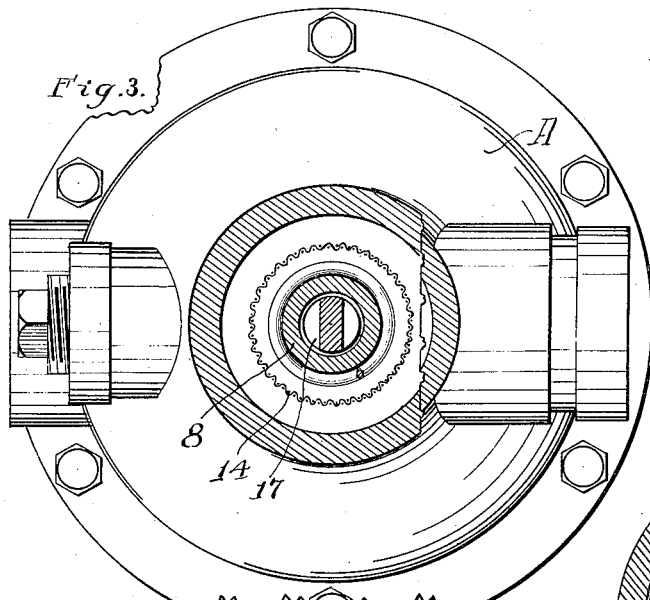
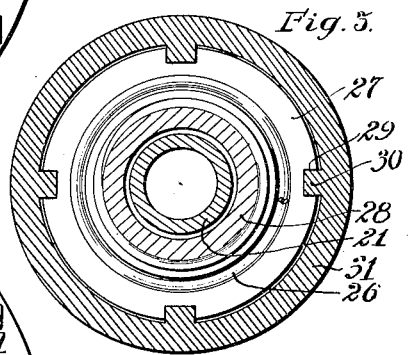
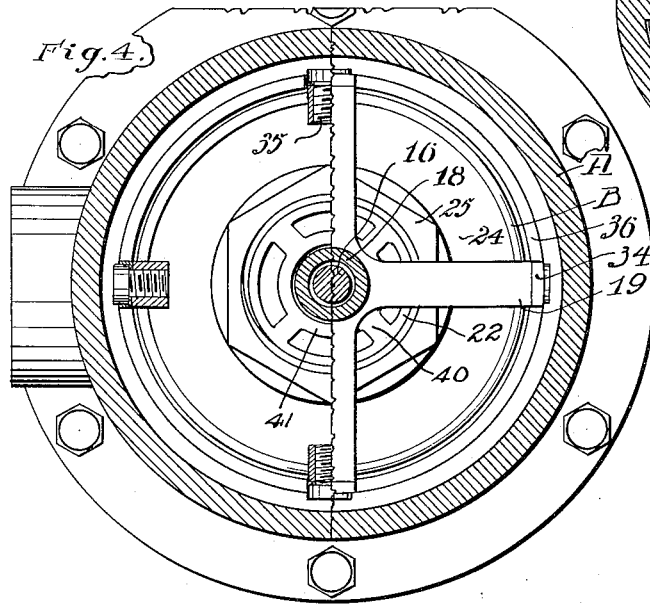
INVENTOR
John Meinken
BY
ATTORNEY Patented Apr. 14, 1931

1,800,463

UNITED STATES PATENT OFFICE

JOHN MEINKEN, OF ST. PAUL, MINNESOTA, ASSIGNOR OF ONE-HALF TO EMIL E. JOHNSON, OF MINNEAPOLIS, MINNESOTA

RELIEF VALVE

Application filed November 21, 1929. Serial No. 408,732.

The present invention relates to a pressure regulating and relief valve.

In hot water heating boilers and other devices in which it is desired to maintain a substantially constant pressure within certain limits, it is desirable to have a valve which will automatically release the pressure therein when said pressure increases beyond a predetermined point and to increase the pressure therein when said pressure falls below a predetermined point.

An object of the present invention is to make an improved and simplified pressure regulating and relief valve.

In order to attain this object, there is provided, in accordance with one feature of the invention, a housing having an inlet for a supply of fluid under pressure, a valve for controlling the entrance of said fluid, and a housing having an offset bellows mounted therein, said bellows being provided with a movable plate in which is supported a relief valve for relieving the pressure when the pressure within the housing rises above a predetermined point.

These and other features of the invention will be more fully brought out in the following description and the accompanying drawings, wherein:

Figure 1 is a view partly in side elevation and partly in vertical transverse section of the device, the larger portion thereof being shown in section to more clearly illustrate the construction and positioning of the parts.

Figure 2 is a sectional view on the line 2—2 of Figure 1.

Figure 3 is a sectional view on the line 3—3 of Figure 1.

Figure 4 is a sectional view on the line 4—4 of Figure 1; and

Figure 5 is a sectional view on the line 5—5 of Figure 1.

Referring to the drawings in detail, a housing A is formed preferably of cast metal with an upper chamber 1 and a lower chamber 2, a wall 3 being provided to separate these chambers, said wall having a threaded opening centrally thereof in which a valve seat 4 is threadedly inserted. A valve 5 is positioned to rest in this seat, the valve having a flange 6 around the lower end to support a coil spring 7, and a plug 8 threadedly inserted in the upper end of said valve. In vertical alinement above the valve 5 is a spring support member 9 which is provided with a downwardly extending flange 10 to prevent displacement of the spring 7 and having an upwardly extending portion 11 which is positioned in the central opening of a plug 12 to be rotatable therein. The plug 12 is threadedly inserted in a larger plug 13, which has a larger diameter than the spring 7, and a tubular screen 14, so that the spring and screen may be removed through the opening when this larger plug is removed. A lock nut 15 is threaded over the smaller plug 12 to lock it against displacement. The pressure on the spring 7 may be increased or decreased by rotating the threaded plug 12 to move it up or down.

The valve 5 has an opening in the lower end thereof through which a valve stem 16 is inserted, the valve stem having a cap 17 threaded onto the upper end thereof to limit the movement of the lower or relief valve 16 with respect to the upper or supply valve 5. The cap 17 has a square projection on its upper end which fits into a square opening in the plug 8 to have a sliding fit therein. The stem of the valve 16 also passes through a tubular member 18 which is supported by means of arms 19, which arms are in turn connected to a bellows B in a manner which will be brought out later in the specification. The valve 16 is positioned with its enlarged lower end adjacent a valve seat 20 on the upper end of a tubular member 21. This tubular member 21 is threadedly connected into a tubular member 22 which is provided with a laterally projecting flange 23 upon which is supported the top plate 24 of the bellows B. A nut 25 is threadedly secured above said flange to firmly grip the top plate and to form a water-tight connection therewith.

A coil spring 26 has the upper end thereof in engagement with the flange 23, while the lower end of said spring rests upon a spring supporting plate 27 which is threadedly mounted upon a rotatable threaded member 28. The plate 27 is provided with a plurality of notches 29 in its periphery, best seen in Figure 5, which engage vertical fins 30 cast integrally with a lower closure plate 31 of the housing 1 to prevent rotation of the plate 27. A square opening 32 is provided in the lower end of member 28 to receive a wrench by means of which the member 28 may be rotated to raise or lower the spring supporting plate 27 to adjust the tension of the spring 26. The threaded member 28 rests in a circular depression in a lower plug member 33, which is threaded into a spring in the lower end of the member 31.

The member 18 through which the stem of the relief valve 16 passes and which has been previously mentioned but not described, comprises a tubular, central portion 18 with four radially projecting arms 19 (see Figures 1 and 4). To the outer end of each of these radial arms 19 is connected a vertical arm 34 (see Figures 1, 2, and 4), by means of screws 35. These vertical arms 34 are connected at their lower ends to an annular ring 36 below which the bellows B is somewhat larger than above. In the present instance the circular cross sectional area of the lower bellows portion is assumed, for the purpose of explanation, to be one square inch greater than the cross sectional area of the upper bellows portion.

At the lower end of the lower bellows portion is a laterally projecting flange 37 which is gripped between the body of the housing B and the removable bottom plate 31 bolted thereto to form a water tight connection therewith.

A valve 38 may be inserted in the inlet opening in the upper portion of the housing to prevent water or other fluid from backing up into the main in case the pressure in the supply pipe should drop below the minimum boiler pressure for which the valve mechanism is adjusted.

The operation of the device is as follows:
First, let us assume that the following conditions exist:
Required boiler pressure minimum twenty pounds per square inch,
Required boiler pressure maximum twenty-seven and six-tenths per square inch,
Supply main pressure thirty-five pounds per square inch,
Effective cross sectional area upper bellows portion five square inches,
Effective cross sectional area lower bellows portion six square inches,
Spring pressure lower spring 26 one hundred and thirty-eight pounds,
Spring pressure upper spring 7 eighteen pounds.

It will be noticed that in Figure 1 both the inlet and relief valves are closed. This condition will exist when the pressure in the boiler is within the above prescribed limits.
Let us assume first that the pressure within the boiler is twenty-three pounds per square inch.

Twenty-three multiplied by six (effective cross sectional area lower bellows portion is six square inches) equals one hundred thirty-eight pounds, which is the downward pressure on the bellows plate 24, which just balances the upward pressure of the lower spring 26.

As the pressure in the boiler falls below 23 pounds per square inch, the bellows plate 24 moves upward carrying with it the valve 16 until the upper surface of the cap 17 rests against the lower face of the plug 8. The additional eighteen pounds pressure of the upper spring 7 must now be overcome. At twenty pounds per square inch boiler pressure the following conditions exist:

Twenty multiplied by six (bellows area) equals one hundred and twenty pounds, plus eighteen pounds upper spring pressure totals one hundred and thirty-eight pounds, just balancing the one hundred and thirty-eight pound pressure of the lower spring 26.

As the boiler pressure drops below this point, the lower spring will force the inlet valve 5 open. The water from the supply main will then enter the system through the valve 5, until the boiler pressure is again above twenty pounds per square inch, when the balance will be again restored and the inlet valve will close. It will be observed that there will be a pressure differential on the inlet valve itself since the entire upper area thereof is exposed to the pressure of the supply main when this valve is closed, while the lower portion thereof is largely within teh valve seat and affected only by the boiler pressure. This produces the desirable result of making the closing pressure required somewhat higher than the opening pressure required.

In relieving after the maximum pressure is reached, the following action takes place: It will be recalled that at twenty-three pounds boiler pressure, the pressure on the bellows plate 24 exactly balances the lower spring pressure with no assistance from the upper spring 7. At this point the cap member 17 moves down within the valve 5 and rests on the lower end thereof. This arrests further downward movement of the valve 16. The tubular central portion 18 of the bellows supporting ring member 36 rests with its lower edge on the enlarged lower end of the valve 16 which arrests further downward movement of the tubular member 18 and of the lower bellows ring 36, which is connected thereto by the arms 19 and 34. The arresting of the lower bellows ring 36 reduces the total effective area of the bellows from six square inches to five square inches, since only the top plate of the bellows is now free for downward movement. When the pressure within the housing reaches twenty-seven and six-tenths pounds per square inch, the downward pressure on the top plate of the bellows is five times twenty-seven and six-tenths or one hundred and thirty-eight pounds, just balancing the upward pressure of lower spring 26. Any increase in the boiler pressure above this point will depress the bellows top plate 24, moving it away from the valve 16 and releasing water through the valve opening of this valve. When the boiler pressure falls below twenty-seven and six-tenths pounds per square inch, the lower spring will close the valve in an apparent manner.

It will be observed that the lower end of the tubular member 18 rests on the enlarged lower end of the valve 16. This tubular member 18 is, as has been previously brought out, connected by the arms 19 and 34 to the bellows ring 36. This ring, which is at the offset in the bellows has an effective area of one square inch, or the difference between five and six square inches. Thus, for every pound per square inch of boiler pressure, there will be one pound of downward pressure on the ring 36 which is transmitted by the arms 34 and 19 to the tubular member 18 which in turn forces the valve 16 onto its seat. This construction, in addition to its other advantages obviates the necessity for a spring to hold the relief valve on its seat.

Arms 40 project radially inward from the member 22 and support an annular ring 41 having a central opening smaller than the lower end of the valve 16 to prevent collapsing the bellows in case of a large increase in boiler pressure, which might be beyond the capacity of the relief valve to handle.

The present valve combines simplicity and sturdiness of construction with positiveness of operation and freedom from valve flutter.

While the valve has been described as being used with a water boiler, it is not desired to limit its use to this medium as it would be equally effective for other liquids and gases where the maintaining of pressure within predetermined limits is required.

I claim:

1. A combined pressure regulating and relief valve, comprising a two-compartment chamber having a valve mounted between said compartments, a spring mounted to normally close said valve, a second valve mounted in said first valve to have limited slidable movement therein and extending downwardly therefrom into said second compartment, an offset bellows mounted in said second compartment, means connected to said bellows at the offset portion thereof and mounted to have limited, vertical movement with respect to said second valve, a valve seat in the upper end of said bellows to seat said second valve thereon, and a spring mounted to exert an upward pressure on said bellows top plate.

2. A combined pressure regulating and relief valve, comprising a two-compartment chamber having a valve mounted between said compartments, a spring mounted to normally close said valve, a second valve mounted to have a limited slidable movement with respect to said first valve and to extend downwardly therefrom into said second compartment, an offset bellows mounted in said second compartment and having a valve opening therein in which said second valve is adapted to seat, and means mounted to limit the movement of the offset portion of said bellows to arrest the operation thereof with respect to said second valve.

3. A combined pressure regulating and relief valve, comprising a two-compartment chamber having a valve opening therebetween, a valve mounted in one of said chambers to seat in said valve opening, a second valve connected to said first valve to have a limited, slidable movement with respect thereto, and extending downwardly therefrom into said other compartment, an offset bellows mounted in said second compartment and having a valve seat therein to seat said second valve, yoke means connecting the offset portion of said bellows to said valve to have a limited, slidable movement with respect thereto, and spring means mounted to exert an upward pressure on the upper portion of said bellows to normally close said second valve.

4. In a combined pressure regulating and relief valve, a pressure chamber, an inlet valve, a relief valve connected thereto to have a limited, slidable movement with respect thereto, an offset bellows having a valve seat therein to seat said relief valve, means connected to the offset portion of said bellows to limit the movement thereof, and spring means mounted to exert pressure on said bellows to normally close said relief valve.

5. In a combined pressure regulating and relief valve, a pressure chamber, an inlet valve, a relief valve mounted in vertical alinement with said inlet valve and adapted to raise said inlet valve on a predetermined movement of said relief valve, an offset bellows mounted in said pressure chamber and having a valve seat therein adapted to seat said relief valve therein, means mounted to limit the movement of the offset portion of said bellows, and spring means mounted to normally close said relief valve.

6. In a combined pressure regulating and relief valve, a pressure chamber, an inlet valve, a relief valve, an offset bellows mounted in said pressure chamber, means mounted to limit the movements of the offset portion of said bellows, means having a limited, slidable movement therein connecting the inlet valve and the relief valve, and spring means mounted to exert pressure on said bellows to normally close said relief valve.

7. A pressure regulating and relief valve, having a pressure chamber with a valve opening therein, a valve mounted to seat in said opening, a second valve connected to said first valve, an offset bellows mounted in said housing and having a valve opening to seat said second valve, means normally urging said bellows against said second valve, and yoke means connected to the offset portion of said bellows and connected to said second valve to be actuated by pressure within said chamber to move said second valve toward its seat.

8. In a pressure regulating and relief valve having a pressure chamber with an inlet valve and a relief valve, an offset bellows having a seat for said relief valve therein, means connected to the offset portion of said bellows and to said relief valve to be actuated by pressure within said housing to force said relief valve against said seat.

9. In a pressure regulating and relief valve, a pressure chamber, an inlet valve, a relief valve mounted in vertical alinement with said inlet valve and adapted to raise said inlet valve on a predetermined movement of said relief valve, an offset bellows mounted in said pressure chamber and having a valve seat therein adapted to seat said relief valve, means mounted to limit the movement of said offset bellows portion, said means being connected to said relief valve to force said relief valve toward its seat during normal operation of said valve, and spring means mounted to force said relief valve seat toward said relief valve.

10. In a pressure regulating and relief valve, a pressure chamber, an inlet valve, a relief valve, means limiting the downward movement of said relief valve, an offset bellows mounted in said pressure chamber, means mounted to limit the movement of the offset portion of said bellows, said means being connected to said relief valve to exert a pressure on said relief valve toward its seat, and means mounted to exert pressure on said bellows to force said relief valve seat toward said relief valve.

11. Valve operating means, comprising a pressure chamber, a valve mounted therein, an offset bellows mounted in said pressure chamber, means mounted to limit the movement of the offset portion of said bellows, and means mounted to exert pressure on said bellows to operate said valve.

In testimony whereof, I affix my signature.

JOHN MEINKEN.